Aug. 15, 1933.  R. E. DE GOLYER  1,922,884
NUT CRACKER
Filed March 26, 1931
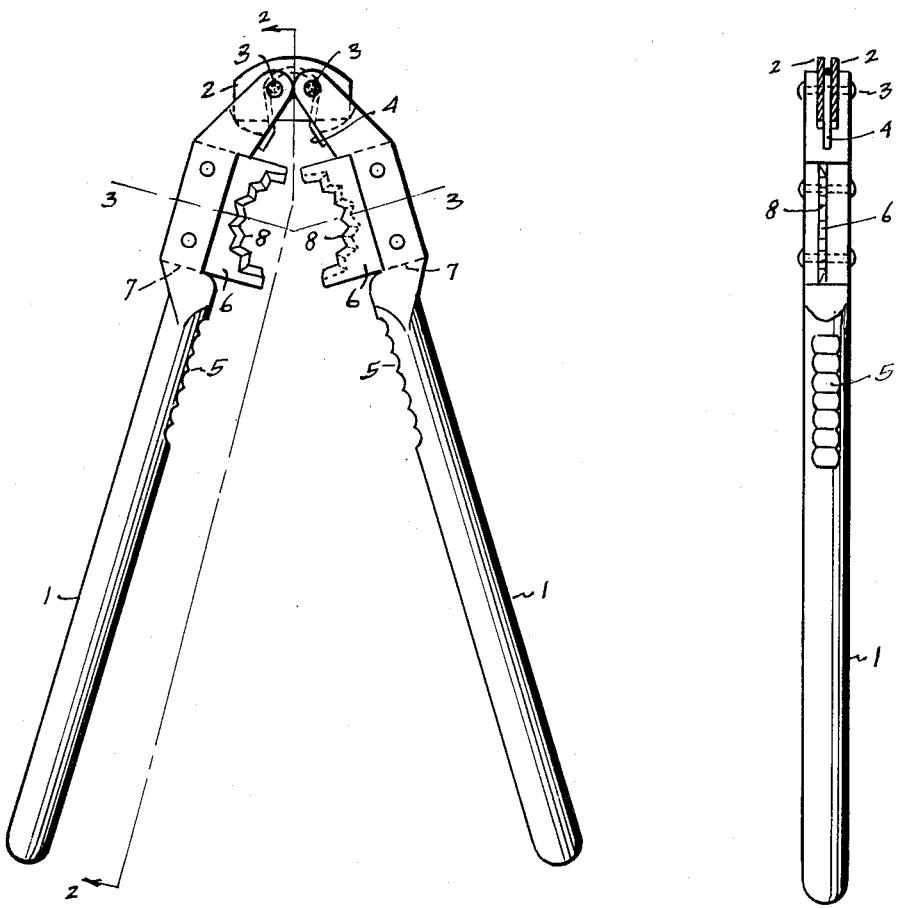
Fig. 1.
Fig. 2.
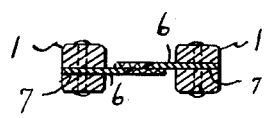
Fig. 3
Inventor
Roy E. De Golyer
By
Hardway Mather
Attorneys Patented Aug. 15, 1933

1,922,884

UNITED STATES PATENT OFFICE 1,922,884

NUT CRACKER

Roy E. De Golyer, Houston, Tex.

Application March 26, 1931. Serial No. 525,382

2 Claims. (Cl. 146—13)

This invention relates to a nut cracker, and has particular relation to a device of the character described having means for removing the ends of nuts, such as pecans, preparatory to the cracking operation.

Another object of the invention is to provide a nut cracker having jaws for cracking the shell of hard shelled nuts and also equipped with shearing blades whereby the ends of the shell may be removed preparatory to the cracking operation. With the above and other objects in view, which will more specifically appear hereinafter, the invention has particular relation to certain novel features of construction, operation and arrangement of parts, an example of which is given in this specification and illustrated in the accompanying drawing, wherein:

Figure 1 shows a side elevation of the device.

Figure 2 shows a sectional view taken on the line 2—2 of Figure 1, and

Figure 3 shows a cross sectional view taken on the line 3, 3 of Figure 1.

In the drawing the numerals 1,1 designate the grip handles which are connected at one end by means of the spaced links 2, 2 to which the operative ends of the handles are pivotally connected by means of the rivets 3, 3. A U-shaped spring 4 is looped around said rivets between said links and the free ends of this spring rest against the adjacent inner sides of the handles, said spring operating to normally hold the implement open. The inner sides of the handles have the serrated portions 5 forming jaws between which the nut may be placed to be cracked. Between these jaws and the pivoted ends of the handles are the shear blades 6, 6. These blades are inserted through slots 7, 7 in the handles and are pinned or otherwise secured therein and their inner margins are substantially arcuate in form and are serrated, forming teeth 8 which are formed with sharp cutting edges. The blades are arranged so that they will work adjacent each other in the fashion of shears as more clearly illustrated in Figure 3 and are provided to shear the ends from the nuts so that they will be more easily cracked.

In operation the ends of the nut may be inserted between the blades 6 and the handles 1, 1 then forced together to shear off the ends of the nut and the nut may be then inserted between the jaws 5 and the shell cracked in the usual way.

The drawing and description disclose what is now considered to be a preferred form of the invention by way of illustration only while the broad principle of the invention will be defined by the appended claims.

What I claim is:

1. An implement of the character described comprising a link, grip handles each having a slot therein and pivotally connected at one end to said link, shear like detachable blades secured in said slots in said handles and arranged to coact, the confronting margins of said blades being serrated and provided with coacting cutting edges arranged to slide, one by the other.

2. An implement of the character described comprising grip handles, a link to which one end of each handle is pivoted, each handle having a slot therein, shear like detachable blades carried by said handles and secured in said slots, and arranged to coact, the inner margins of said blades being arcuate and having cutting edges arranged to slide one by the other, said cutting edges being serrated.

ROY E. DE GOLYER.